US006639614B1

(12) United States Patent
Kosslyn et al.

(10) Patent No.: US 6,639,614 B1
(45) Date of Patent: Oct. 28, 2003

(54) MULTI-VARIATE DATA PRESENTATION METHOD USING ECOLOGICALLY VALID STIMULI

(76) Inventors: Stephen Michael Kosslyn, 28 Garfield St., Cambridge, MA (US) 02138; Giorgio Ganis, 130 Brainard Rd., Apt. 8, Allston, MA (US) 02134-3734; Robin Sue Rosenberg, 28 Garfield St., Cambridge, MA (US) 02138

( * ) Notice: Subject to any disclaimer, the term of this patent is extended or adjusted under 35 U.S.C. 154(b) by 445 days.

(21) Appl. No.: 09/613,605

(22) Filed: Jul. 10, 2000

(51) Int. Cl.[7] ................................................ G09G 5/00
(52) U.S. Cl. ....................................... 345/837; 345/440
(58) Field of Search .................................. 345/836, 837, 345/839, 976, 977, 440

(56) References Cited

U.S. PATENT DOCUMENTS

| | | | |
|---|---|---|---|
| 5,021,976 A | * 6/1991 | Wexelblat et al. | ........... 345/853 |
| 5,043,920 A | 8/1991 | Malm et al. | |
| 5,142,590 A | 8/1992 | Carpenter et al. | |
| 5,321,800 A | 6/1994 | Lesser | |
| 5,347,452 A | 9/1994 | Bay, Jr. | |
| 5,375,201 A | 12/1994 | Davoust | |
| 5,452,409 A | 9/1995 | Smith | |
| 5,555,354 A | 9/1996 | Strasnick et al. | |
| 5,581,677 A | 12/1996 | Myers et al. | |
| 5,636,350 A | 6/1997 | Eick et al. | |
| 5,671,381 A | 9/1997 | Strasnick et al. | |
| 5,675,746 A | 10/1997 | Marshall | |
| 5,730,140 A | * 3/1998 | Fitch | ............ 600/514 |
| 5,774,878 A | 6/1998 | Marshall | ...... 705/35 |
| 5,861,891 A | 1/1999 | Becker | |
| 5,973,693 A | 10/1999 | Light | |
| 6,191,799 B1 | * 2/2001 | Purdy | ........... 345/473 |

OTHER PUBLICATIONS

Stephen M. Kosslyn, "elements of Graph Design"; title page, publishing page, and pp. 267–270.
Jarke J. van Wijk and Huub van de Wetering. "Cushion Treemaps: Visualization of Hierarchical Information" Eindhoven University of Technology, Dept of Mathematics and Computing Science.
Web document, "Treemaps for space–constrained visualization of hierarchies", web site: http://www.cs.umd.edu/hcil/treemaps, , picked as of Apr. 19, 2000, four pages.
Web document, "Map Instructions", web site: http://www.smartmoney.com/marketmap/instructions.html, picked as of Apr. 19, 2000, two pages.
Web document, "SmartMoney Today: Market Today: Secrets to Using the Map of the Market", web site: http://www.smartmoney.com/smt/markets/news/index.cfm-?story=199812313, picked as of Apr. 19, 2000, three pages.

(List continued on next page.)

*Primary Examiner*—John Cabeca
*Assistant Examiner*—Brian Detwiler
(74) *Attorney, Agent, or Firm*—Brian L. Michaelis; Joseph P. Quinn; Brown Rudnick Berlack Israels LLP

(57) ABSTRACT

A method is provided whereby combinations of ecologically valid images and sounds are used for visualization of large amounts of information. Icons and sounds are selected and combined to accentuate natural recognition of pattern information and changes. A visual field of similar icons represents a corresponding field of data sets, where the appearance of each icon illustrates the respective values of the underlying data. Within each icon, elements change in shape, size, number, color, and motion to illustrate the respective changes of data within the corresponding data set. Stereophonic sound occurrence, spatial location, type, and volume signal the user about the general situation, as well as the type and importance of individual data changes, stimulating the user's attention during events of interest.

13 Claims, 6 Drawing Sheets

OTHER PUBLICATIONS

Web document, "SmartMoney.com: Map Station", web site: http://www.smartmoney.com/mapstation/, picked as of Jun. 18, 2000, three pages.

Web document, "SmartMoney.com: Map Station", web site: http://www.smartmoney.com/mapstation/index.cfm?story=pricing, picked as of Jun. 18, 2000, two pages.

Web document, "SmartMoney Today: Market Today: Secrets to Using the Map of the Market", web site: http://www.smartmoney.com/smt/markets/news/index.cfm?story=199812313, picked as of Apr. 19, 2000, three pages.

Web document, "Map Instructions", web site: http://www.smartmoney.com/smt/marketmap/instructions.html, picked as of Apr. 07, 2000, two pages.

* cited by examiner

FIG. 8

| Flower Icon Elements | Range | Data Element |
|---|---|---|
| Number of petals | 1-12, mean 6 | Price change since baseline, dollars |
| Size of Head | 1-7, normalized for present range | Absolute price of stock |
| Length of Stem | 1-7 | Present standard deviation of price, in 0.5 SD increments, compared to average |
| Color of Stem | Green/Red | Price up or down |
| Color of Grass | Green/Brown | Price up/down for previous N trades |
| Change of Icon | | |
| Motion of Flower Stem | Slow, medium, fast | Standard deviation of price relative to baseline |
| Color of Head | Red, Green | Price: Green up, red down |
| Intensity of Head Color | Bright, Dim | Bright, large change; dim, small change |
| Blinking | fixed at once per second; duration fixed at 30 seconds | Price changed |
| Negative Sounds | Loudness in 100 increments | proportional to volume of trade |
| Violin low notes | | Price 0.5 SD lower |
| Piano low notes | | Price 1 SD lower |
| Bass low notes | | Price 2 or more SD lower |
| Positive Sounds | Loudness in 100 increments | proportional to volume of trade |
| Violin high notes | | Price 0.5 SD higher |
| Piano high notes | | Price 1 SD higher |
| Trumpet high notes | | Price 2 or more SD higher |
| Location of Sounds | Right to Left, 3 steps each way; Fixed at two steps | Negative left; Positive right; |
| Background sounds | Selected from negative or positive sounds; Volume in 100 increments | Average market below or above baseline; Volume of trades in the market |
| Special Events | Bunny nibbling near flower | News item for the stock |
| | Flower all black | Trading suspended |
| Border colors | Green, red; Color saturation; Color intensity | Overall volume up, down; Proportional to amount of change since baseline; Overall volume since baseline | ns. Thesetations are purely

MULTI-VARIATE DATA PRESENTATION METHOD USING ECOLOGICALLY VALID STIMULI

FIELD OF INVENTION

The present invention relates to graphical and auditory presentation of data, particularly for exploiting human pattern recognition.

BACKGROUND

The field of information visualization includes the use of graphs to convey information in a useful manner. Appropriate information displays can bring life to otherwise inert matrices or streams of numbers. Human perception and recognition of data trends can be facilitated through construction of comprehensible graphs. This trend perception is especially important when given large amounts of multi-variate data from which useful information must be quickly derived. Depending upon the environment and the importance of the decisions to be made, even the best information can become overwhelming. An example of one such environment is a fast-paced stock trading room where financial analysts are expected to quickly assess various online sources of information and make irrevocable decisions that can effect their very careers. Other situations arise in civil emergencies where an uninformed decision could jeopardize lives. The computer industry has generated a number of tools for coping with problems such as these.

Our brains allow us to do many things that defy even the most complex artificial systems. At the fore is our ability to organize a diverse range of information into relatively simple patterns and to monitor these patterns for outliers; cases that break ranks with the majority. The brain is the best "pattern detector" in existence. The conventional data visualization tools have failed to take advantage of the various cognitive and perceptual powers of the brain in any structured manner.

A graph is a visual display that illustrates one or more relationships among numbers. The best graphs are those that permit a visual pattern, trend or comparison to be quickly and accurately comprehended by a human reader. A poorly designed or constructed graph can be difficult to decipher properly, and could result in contusion or erroneous conclusions. Based upon knowledge of the particular audience, coupled with an understanding of human perception and cognition, a certain craftsmanship can be brought to bear upon the task.

Application of empirical findings from research on human cognition and perception to creation of graphs is explored in Stephen M. Kosslyn's book, "Elements of Graph Design," (W.H. Freeman & Co., 1994), which is incorporated herein by reference. The author evaluates many of the factors that should be considered when selecting a graph format to present specific content for a specific purpose, and derives a set of principles having a basis in the physiological psychology of human cognition and perception. Exploitation of these principles when formulating a graphical presentation can dramatically improve the useful information content without appreciable increase in visual complexity. The author derives a list of principles that provide a framework against which to calibrate the relative effectiveness of various approaches to data visualization. In general, the principles can be divided into three sections: one regarding the way in which we actively organize and interpret what we see; another regarding how meaning is derived from visual displays; and a third related to memory and processing limitations related to proper interpretation. These same principles also apply directly to patterns of sounds.

One approach for display of information is disclosed in U.S. Pat. No. 5,671,381 issued to Strasnick. A three-dimensional, virtual reality display space is created to contain objects that represent blocks of data as 3-D bar-charts. Attributes of the data are mapped to visible or audible characteristics, such as an icon having a specific size or color. The spatial relationship and connecting lines between icons in the landscape represent structural relationships that exist in the underlying data, with the ground plane representing a numerical value as a common surface plane. Artificial perspective (with object compression near the horizon) adds to the realism of the view. A user can arrange the objects according to a preferred lexical order, and then "tour" across the landscape to browse or search for particular data items or relationships.

There are many disadvantages of this method of visualization. For one thing, the data representations are purely artificial, much like a two-dimensional bar-chart with its necessarily limited information bandwidth. A static hierarchical tree paradigm dictates the arrangements between the icons, illustrated by cluttered linkage lines. In essence, the user can merely navigate through a sea of bar charts illustrating the size and age of files, or similarly benign parameters. There is no means for indicating any data changes, nor their magnitude, relevance, or direction. Given the lack of change information, it would be impossible to detect any patterns of changes among the data sets. Furthermore, sound is implemented solely as a "warning tone" triggered when the user's cursor touches a file icon having a predetermined attribute. There is no selection from a variety of meaningful sounds, or any concept of spatial orientation, intensity, or inherent recognition of the sound's meaning, other than its mere occurrence.

Significantly, the system relies upon the virtual (i.e., artificial) reality context, a computationally complex, and visually distracting data display. Virtual reality (VR) attempts to replicate physical reality, where the better the VR system, the better the rendition. Visualizations of this type accentuate the details at the expense of data comprehension. As described in Kosslyn's "Elements of Graph Design", human users can reliably process only a limited amount of visual information at one time, depending on a number of psychological factors including relevance and alertness. It takes additional effort for the mind to construct a 3-D perceptual organization of random icon meanings and orientations, especially when they are made even less intelligible by the artificial variations and distortions constantly introduced by "navigating." A VR display contaminated with irrelevant or overly detailed information may actually reduce the ability to properly perceive the data patterns of most interest.

A similar arrangement, specifically addressed to visualization of information useful to money managers, is disclosed in U.S. Pat. Nos. 5,675,746, and 5,774,878, both issued to Marshall. In these and related patents, so-called 3-D "metaphors" are used to represent data in a virtual reality setting, where characteristics of each metaphorical object are determined by the corresponding data. The shape, color and rotation of each object may change according to the data, or to highlight criteria selected by the user. The location of the object may represent the source of the information (e.g., a selected market information feed), or a collective similarity (e.g., industry groups). The user may then "fly" among the objects to observe their characteristics more closely. For example, objects "floating" above the perceptual ground plane could represent data for stocks trading "above average." The respective meaning of sounds, shapes and movement of 3-D objects are specified by the system configuration, although no particular arrangements are described.

Many of the disadvantages of this system relate to the limited visualization mechanisms employable. The arrangement of icons is according to a predetermined set of three-dimensional axes. The icons themselves have corresponding shape, size and color that are purely arbitrary and which lend very little to any inherent perception of their respective value. The portrayal of spinning, colored or pulsating icons merely represent data or data trends that have already been calculated. The totally abstract landscape does not lend itself to evaluating any recognizable objects, let alone interactions or patterns. There is nothing in the virtual reality arrangement to facilitate recognition of "outliers", i.e., the few non-conforming data sets. Each of these limitations of the prior art fosters a requirement for a large amount of learning before the display begins to become useful for anything more than a data browsing tool.

In addition to the other disadvantages of virtual reality mentioned above, a user unfamiliar with the medium not only must learn to configure and navigate the data, but can easily become overwhelmed or disoriented by the lack of uniformity or structure. At most, the Marshall system is disadvantageously grounded on depth perception, and spatial intuition, which do not recognize the limits of human cognition, memory, or comprehension. Without these elements properly constrained, the virtual reality icons remain relatively indecipherable, and the information representations frustratingly inscrutable. Furthermore, the use of sound by Marshall has the disadvantage that it is used only for manually identified and selected/highlighted cases rather than showing patterns or any other information general to the data set. Even when sound is implemented, there is nothing to indicate how the sound can be used to provide multivariate texture to the audible display.

In an effort to bring a physical association to data visualization techniques, U.S. Pat. No. 5,321,800, issued to Lesser, describes a graphical method tied to medical data about a patient. A single display template is arranged as a representation of the human form, with binary information icons imposed upon fixed locations of the form. The present data values are illustrated by varying the color or intensity of a specific anatomical location of the display corresponding to the data item. Once a user (i.e., nurse or doctor) has thoroughly learned the location and meaning of the various elements, the theory is that the information about the present patient can be quickly deciphered. For example, arm color of blue may represent the corresponding location of an infection, and specific blocks of colors on the chest or abdomen may represent recent blood-testing results, vital signs, patient complaints (e.g., pain), or other diagnostic observations. Data excursions beyond predetermined thresholds can be indicated by blinking red icons at the plotted location.

Among the many disadvantages of the Lesser system is that, like Marshall above, the shapes and changes in the icons provide precious little if any information that capitalizes upon human perception, memory or comprehension. The proposed placement of rectangular blocks of data is completely arbitrary, other than the obvious anatomy-oriented locations dictated by the patient data itself. Even the examples described in the illustrative embodiment demonstrate a general disregard for human cognition. For example, everyone knows that an area of infection is "red," because of inflammation, yet Lesser would indicate such a state with a blue icon. Similarly, the data icons are comprised of fixed size, shape and location, using combinations of three colors: red, green, and yellow, to represent "deviations" from a normal value. This severely restricts the Lesser approach to types of data that can be characterized as normal or abnormal conditions. It also limits the information to a level of abstraction that relies upon the system parameters and requires specific assumptions be made about the patient to predefine the binary thresholds of such normality. Similarly, Lesser makes no reference to sound at all, other than "bowel sounds" the status of which may be reflected in a correspondingly colored icon. Ignoring this multimedia dimension further limits the amount of status information that can be derived.

Furthermore, a "Lessergram" as taught by Lesser indicates the underlying data for one case at a time, not large numbers of cases. The design of Lesser fails to capitalize on any pattern relevance that would be cognizable across more than one data set, let alone hundreds. There is no "analogical mapping" of data in which completely different objects represent values of different measurements. Lesser uses the same rectangular shape over and over again for dozens of different types of data, dramatically aggravating an already steep learning curve.

Although Lesser does suggest superficially that a Lesser-Gram could be applied to "business data" or other forms of information, there is no suggestion whatever that such a display could apply to anything more than purely physical, process-oriented data. One must presume, given the one-to-one relationship of data and display elements, that a Lesser-Gram would require a fixed physical shape of some sort, determined by the process itself. Colored pieces would then portray some binary data status of the process being monitored. Again, this has nothing at all to do with defining icons or data representations to exploit the advantages or limitations of human memory, perception, or comprehension. At the very least, anyone familiar with one type of LesserGram for human medical information would have no idea how to apply the same technology to a different type of data, say, air traffic control, or weather.

One other example of using matrices of rectangles with different shapes and colors is in use by SmartMoney.com of New York, NY, to illustrate stock market data. According to their information, Market Today, a user can see "The market at a glance." Information about six hundred publicly traded stocks is arranged into industry segments. Individual market capitalization of each company dictates the relative size of a rectangle representing a company, and blocks within an industry segment that have similar histories of pricing movements are arranged next to each other. During a trading- session a user can request an update of the display when current information is desired. The color of each block varies in twelve steps from bright red, to black, to bright green (or another selectable spectrum, blue/yellow), indicating the present change in price with respect to a selected baseline (e.g., yesterday's close).

Significantly, the market map demonstrates many of the disadvantages of visual information overload, without actually highlighting the news. Rectangles dictated by the nearly two thousand data points are squeezed into seemingly arbitrary locations on a display screen and then six hundred data points of a single metric (i.e., daily change) are simultaneously varied at the will of the market. Given the resulting confusion of data, the average user cannot be reasonably expected to quickly perceive changes, let alone patterns, unless several large, adjacent stocks happen to change simultaneously. The equivalent percentage change in a dozen "small" stocks would not even be visible, albeit noteworthy, unless the changes all happened within the same arbitrary industry segment (i.e., adjacent rectangles), and only if the user happened to be closely monitoring that area of the map. This defeats the whole purpose of a usable monitoring tool.

The market map display is disadvantageously static. There is no display motion or audible representation to indicate any sort of change, nor whether the change is relatively good or bad, only that the underlying data is presently up or down from the start. In fact, there is no indication at all that anything in the display itself has changed—the user must attempt to remember what was previously displayed and mentally compare all 600 stocks (or at least some of them) when the display is next refreshed. Transitions in the market map rectangles from red to black to green are shown using more than ten variations in color, forcing a user to perceive, recognize, recall, and understand the subtle differences, a daunting (if not impossible) task when under immense pressure.

Paradoxically, since the data icons never change size or shape, the method limits the amount of visual information that could be usefully displayed about any particular datum. Aside from the fact that SmartMoney provides transitional information about only a single data metric (i.e., percentage change since last close), it has several other serious drawbacks with respect to data visualization. The market map is constructed using the fixed hierarchy of industry segment, market caps, and percentage changes. A user is helpless when it comes to organizing the display according to other metrics that may be preferred by the user. Even if the viewer could select stocks or specific arrangements or collections for monitoring, the only thing that ever changes is the colors. The map of the market does not take any advantage of the abilities of the human mind to perceive, memorize, and comprehend limited amounts of salient information, or to detect changes of display motion.

SUMMARY OF INVENTION

The present invention provides a new method whereby combinations of "ecologically valid" (i.e., occurring in everyday environments) images and sounds are used for visualization of large amounts of information. Icons and sounds are selected and combined to accentuate natural recognition of pattern information. A visual field of similar icons represents a corresponding field of data sets, where the appearance of each icon illustrates the relative values of the underlying data. Within each icon, elements change in size, number, color, and motion to illustrate the respective directions and magnitude of changes of data within the corresponding data set. Stereophonic sound occurrence, timing, spatial location, type, and volume signal the user about general data situation, as well as the type and importance of individual data changes, stimulating the user's attention during events of significance.

According to an illustrative embodiment of the system, an icon suggesting a recognizable life form is selected as the basis for visualization of a multi-variate data set. Life forms, such as flora and fauna, are known to grow, move and change colors according to their inherent physical determinants. For example, a healthy flower such as a daisy has a green stem, and gets larger and taller, and has more petals, as naturally determined by the flower's environment. A shorter, brown flower that has lost most of its petals would be instantly recognized as produced by a less satisfactory condition. Furthermore, a flower can wave in proportion to the breeze, and the fertility of the area around the base of a flower may convey additional information regarding the local trends.

Similarly, an auditory display of the system selects sounds that are easily recognizable as positive or negative (i.e., good/bad). The sounds are then produced in loudness, location, and timing patterns according to the underlying data. For example, loud and frequent bird-chirping sounds on the right side would indicate a generally positive environment, whereas a rumbling of thunder to the left would give a more negative impression. Musical sounds of various instruments and tones could also be used instead of, or in addition to animal or weather sounds.

By using an ecologically oriented graphical icon, a wide number of different parameters can be simultaneously depicted. Motion and sound are used to highlight important changes, or to lend assurance that a status quo prevails.

In an illustrative embodiment, an icon of a daisy is configured to represent financial data such as relative change in stock price from opening, absolute stock price, standard deviation in price, direction of change in price, volume of trades, and short-term trends. These parameters are mapped to the number and size of petals, the frequency of swaying motion, the color and length of the stem, and the color of the grass near the stem. The magnitude of change is represented by the waving motion, where bigger changes make the waving faster. Similarly, when a sound occurs, the appropriate flower "lights up", and pulses for a predetermined period with green for a higher trade, red for a lower trade. The stock symbol can also appear next to such blinking flowers for a predetermined time. Hundreds of such "daisies" can then be arranged on a display, and sorted (e.g., top to bottom) depending upon a user-selectable choice of display parameter. These flowers can be further sorted into quadrants of different types of flowers, not just daisies, with the type of flower representing a categorical variable, such as stocks from a particular industry. Positive and negative sounds are then superimposed on the display according to whether stocks are being traded for prices above or below their respective averages.

Unlike the prior art, the present method includes ecologically valid icons with which a human is likely to be familiar. This method includes a visual uniformity, salient data icons, low clutter yet higher dimensionality, and sound overlays. In addition, there are alerts to changes (both visual and auditory), a palette of tones, and selectable data for either a binary condition (red/green) or a scaled measure of variations. Little superfluous information is displayed, unlike VR approaches, and since less detail is needed, more information becomes recognizable. There is no "change for change sake" since nothing moves unless the corresponding data has changed. Lower attention is necessary since you're not "flying" anything, but rather planted firmly on the grass background with the flowers. This method exploits human mental powers of perception, memory and cognition. The data icons can also be simply sorted (e.g., top to bottom) by user selectable parameters to give inherent order to the depiction without the inflexibility of predefined dimensionality.

Outliers are readily apparent from the behavior of the icons, especially where large changes are indicated by proportional changes in sound, color, and motion. Like picking out the image of a rabbit in a wheat field, the human mind quickly tunes out the irrelevant visual data. The use of ecologically valid visual icons reduces the learning time and operator confusion and capitalizes on the cognitive abilities of the human viewer.

Similarly, the use of natural sounds facilitates recognition of positive or negative circumstances or present changes. The location, volume, selection, duration and other attributes of the sounds are easily mapped by the brain to represent the corresponding information regarding the magnitude and type of changes simultaneously occurring in the visual data. The presence of the sounds allows the user to look away from the computer screen, while being able to listen to sounds that indicate a change in the data that may require visual attention.

Unlike Lesser, or other process-oriented visualization methods, the ecologically valid visual and audible icons can be easily adapted to represent numerous types of data for which patterns and changes must be quickly and efficiently recognized. The analysis is divorced from the one-to-one correspondence for which intuition or training are imperative, as would be required when using a LesserGram. The same operator, using the same icons, can apply the tool to many different types of data, and detect the necessary information quickly, be it weather phenomena, stock markets, or other data intensive analyses, without necessarily understanding the underlying processes that create the data, and unencumbered by the analytical prejudices spawned by such familiarity.

Displays created according to the inventive method are intentionally limited with respect to the amount of information that can be directly determined from inspection, in an effort to focus upon the most relevant factors, their changes, and the direction and magnitude of such changes. Because of the uniformity of the many icons, they can quickly be compared with each other for changes, while still observing general trends, if necessary. Direction of change is binarized, with the magnitude displayed only for selected changes (petals, stem, speed, sound volume), thus limiting the amount of refined discrimination required by the user. Changes are indicated not only with visual movement calculated to stimulate the visual perception per se, but also with the simultaneous sound occurrence. Movement speed, sound volume and location, and sound selection draw the user's attention to the other instantaneous changes that have occurred (petals, stem length). Thus, the occurrences of multidimensional changes are quickly recognized, along with the outliers and interactions with other data sets.

BRIEF DESCRIPTION OF THE FIGURES

These and other features of the present invention will be better understood in view of the following detailed description taken in conjunction with the drawings, in which:

FIG. 8 tabulates a correspondence between examples of display and audible elements and data characteristics in an illustrative embodiment.

DETAILED DESCRIPTION

Figure 1:
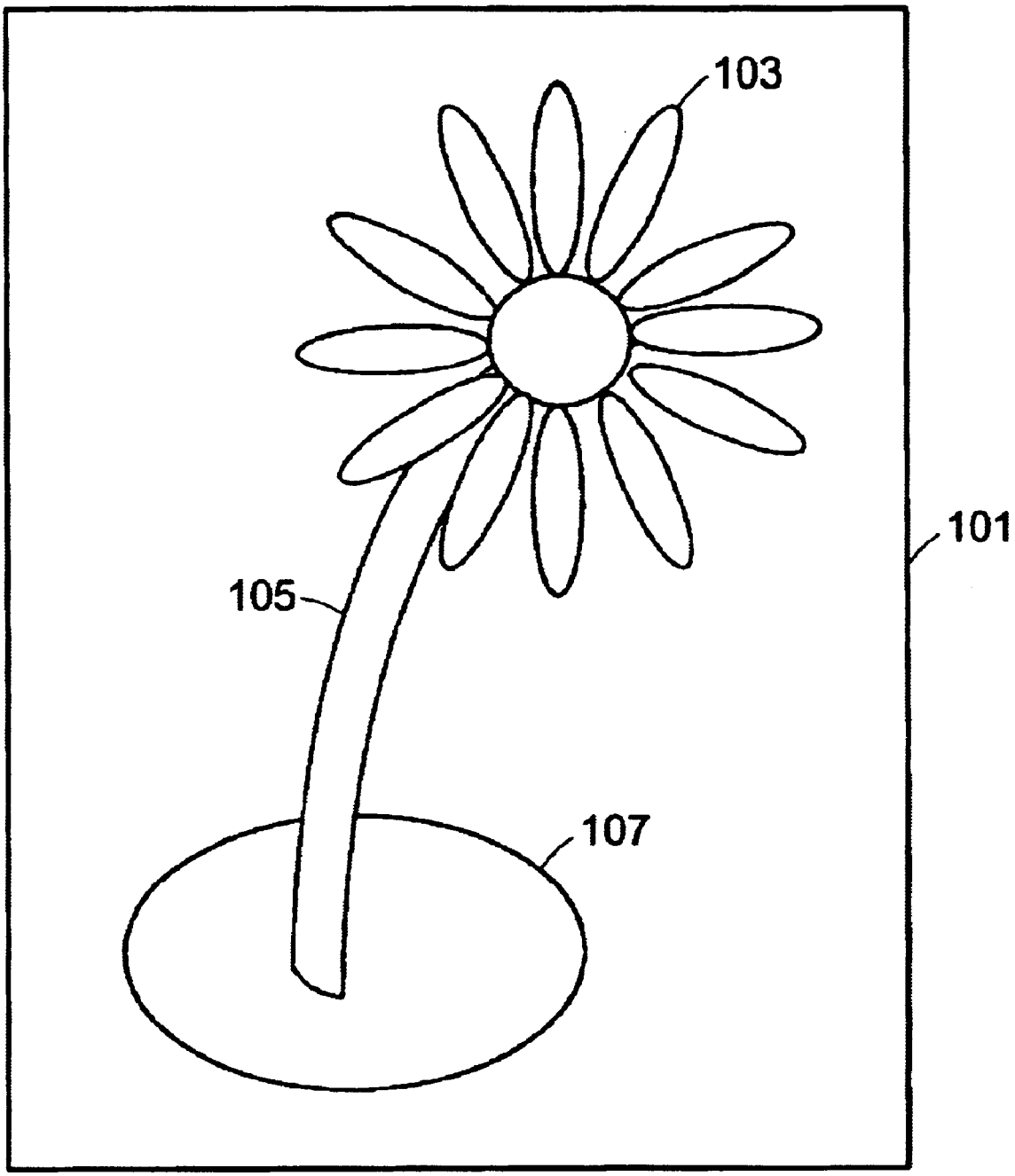
FIG. 1 illustrates the elements of a visual icon according to an illustrative embodiment of the system.
Figure 3A:
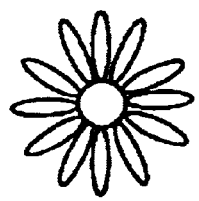
FIGS. 3a–3d illustrates another variation of a data-display element of the icon in FIG. 1.

The present invention provides a new and useful data visualization system whereby displayed sounds, visual patterns, changes in the sounds and patterns, and motion are selected in a manner that provides ecologically valid stimuli for quickly identifying changes and noting trends. The recognition of changes in data, their magnitude, type, and direction can be simplified by using appropriate visual and auditory symbols that take into account the nature of cognitive and perceptual processes as well as their underlying brain mechanisms. The goal is to design a display that exploits what is known about brain mechanisms and principles of graph design in order to provide both a sense of the overarching patterns in very large sets of data and the existence of specific cases that diverge from the overall pattern. These brain mechanisms are used to recognize, remember, and understand objects and events in our environments, both natural and man-made.

A user interface design incorporates three key features: the display is constructed to take advantage of brain mechanisms that evolved to help our species survive; both visual and auditory "ecologically valid stimuli" are used; and the principles of graph design are applied. In particular, brain mechanisms that underlie survival skills, such as those that allow us to hunt for and gather food and avoid predators, are of interest. Effective hunting requires not only the ability to monitor information representing a static landscape, but also spot and interpret a change quickly and accurately, such as a moving deer in a forest.

The displays rely upon images of objects (flora, fauna, human artifacts and other complex and dynamic objects) occurring in the natural landscape, and everyday environments as well as sounds that our species is adapted to register easily. Our brains evolved to recognize, remember, and reason about such objects and events quickly and accurately, and the system makes use of these capacities as applied to the display of data. By further combining the principles of graph design, the displays can be designed to present information clearly. Unlike other displays, those designed according to the present system are compatible with the perceptual, memory and reasoning brain mechanisms that we use to perceive and interpret everyday stimuli in our environments.

The system disclosed provides a multi-tiered cognitive environment for presentation of data: the auditory indications of change, the visual display patterns, and the relationship between the auditory and visual displays. Auditory changes alert the user that "something is happening," at the very least. Visual patterns present very large data sets, allowing discovery of the source of activity and changes among data elements. Once a change has been noticed, a user interface of the system provides further features for selecting or enhancing the changed icon for display of further detailed information.

One illustrative embodiment of the system is a display for presentation and tracking of financial stocks. Auditory and visual displays are then designed to signal not only the current global state of the data, but also large-scale changes, as well as important changes of individual entries. The state of approximately 100 stocks of interest, and a global state of their average value of the stocks can be represented using the features of a personal computer having a color video display and a stereophonic sound-producing mechanism, such as speakers or headphones. Data can be fed to the system, either in real time, or played back from a storage medium, as the user's application may require. The auditory display indicates the mean value of the stocks, changes in this value (e.g., with respect to opening price), and large changes (up or down) of individual stocks.

Audible changes in the mixture of "positive" and "negative" sounds signal the state of the data set, and loud changes signal large movements in an individual stock (with different sounds for up or down). Sounds are distributed randomly over 30-second windows, with one event per appropriate measure. Each of the events lasts 2 seconds. For users raised in Western cultures there is also a natural scale having negative elements to the left (sinister) and positive elements to the right. Negative sounds are selected from a set of preconfigured sounds and played with a left spatial orientation, i.e, the left speaker. Examples of negative sounds are: raindrops for negative stock-price trades at less than a half standard deviation (0.5 SD) below its average, whooshing wind for less than 1 SD below average, and a crack of thunder for a stock traded at less than 2 SD below its average. Examples of positive sounds, played in the right speaker, are: cricket chirp, bird chirp, owl warble for each time a stock is traded for more than 0.5, 1, or 2 SD above its average, respectively. In all cases, the louder the sound, the larger the volume of trade, with approximately 100 levels of sound volume. These relationships, and other illustrative examples described below, are summarized in the table of FIG. 8.

Other sets of sounds can be selected for either positive or negative indications, or both. A corresponding set of increasingly negative sounds might, for example, include violin low notes, piano low notes (lower than the violin), and bass low notes (lower than the piano note). Similarly, a set of increasingly positive sounds could include violin high notes, higher piano high chords, and yet higher trumpet high notes. As described, there are six different sounds to indicate a direction and magnitude of change, as well as the "sound" of silence when nothing has changed significantly.

The background sounds, which represent the market as a whole (or the segment being displayed) are selected from the set of consonant or dissonant sounds to convey conditions above or below the opening, respectively. As the average amount above opening price increases, the relationship among the harmonics of the background sounds will become "brighter" or more consonant (e.g., with 7ths) and as the amount below opening becomes larger, the background sounds will have an increasing degree of dissonance. The overall volume of the background. sound will reflect the volume of trades in the market being monitored.

In addition to the audible layer of data presentation, the system of the illustrative embodiment includes a visual display element comprised of a field of commonly recognizable objects that capture key features of the data set. According to an illustrative embodiment, all of the objects are comprised of identical elements to facilitate recognition of changes. In the example shown in FIG. 1, a daisy shape has been selected as the basic display icon 101. The daisy has several recognizable ecological elements including the petals forming the head 103 of the daisy, the stem 105 supporting the head 103, and the base 107 in which the daisy is "planted." Each of these elements can be varied, forming a combined display element that can be quickly interpreted for its information content. In addition, a side-to-side motion and blinking color can be used to highlight various changes to other elements.

Figure 2A:
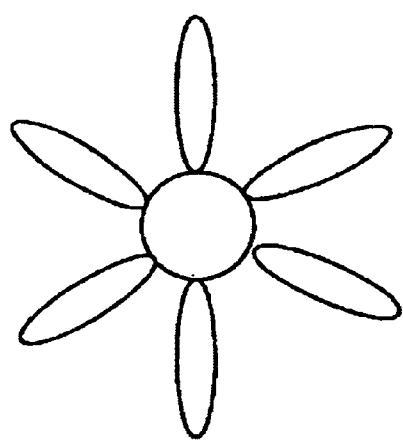
FIGS. 2a–2c illustrates the variation of a display element of the visual icon of FIG. 1.
Figure 3B:
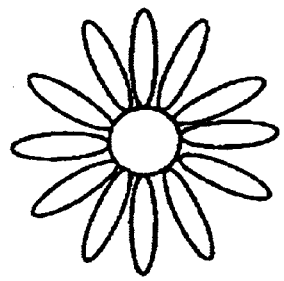
Figure 2B:
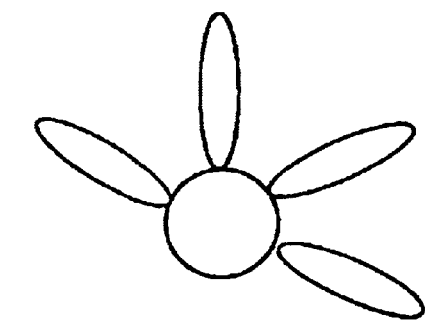
Figure 3C:
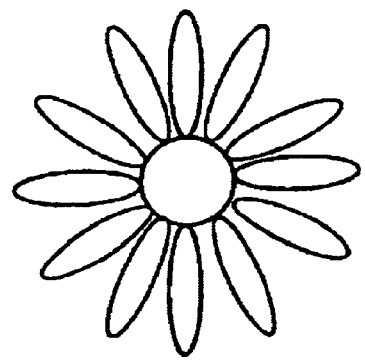
Figure 2C:
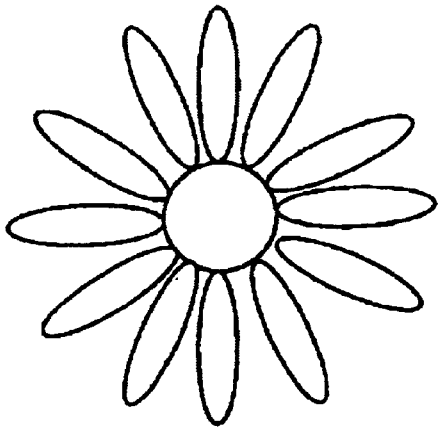
Figure 3D:
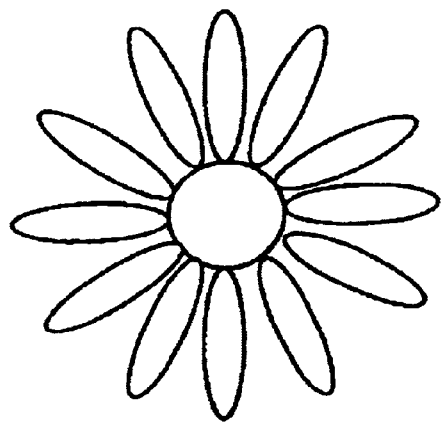

As shown in FIG. 2, the number of petals in the head of the daisy can be changed to indicate the incremental changes in stock price. FIG. 2A shows a 6-petal daisy which indicates that the price has not changed. FIG. 2B shows a flower head in which there are two petals missing, thus indicating a two-point change down from the opening price. FIG. 2C shows a flower with 12 petals, indicating a six point increase in price. This arrangement permits the direct display of the range from 1 to 12 petals indicating 5 points down or 6 points up. Each petal can also represent a change of 2 dollars, or some other multiple; petals can also be used to indicate percent change, with each petal corresponding to a fixed percentage.

Figure 4:
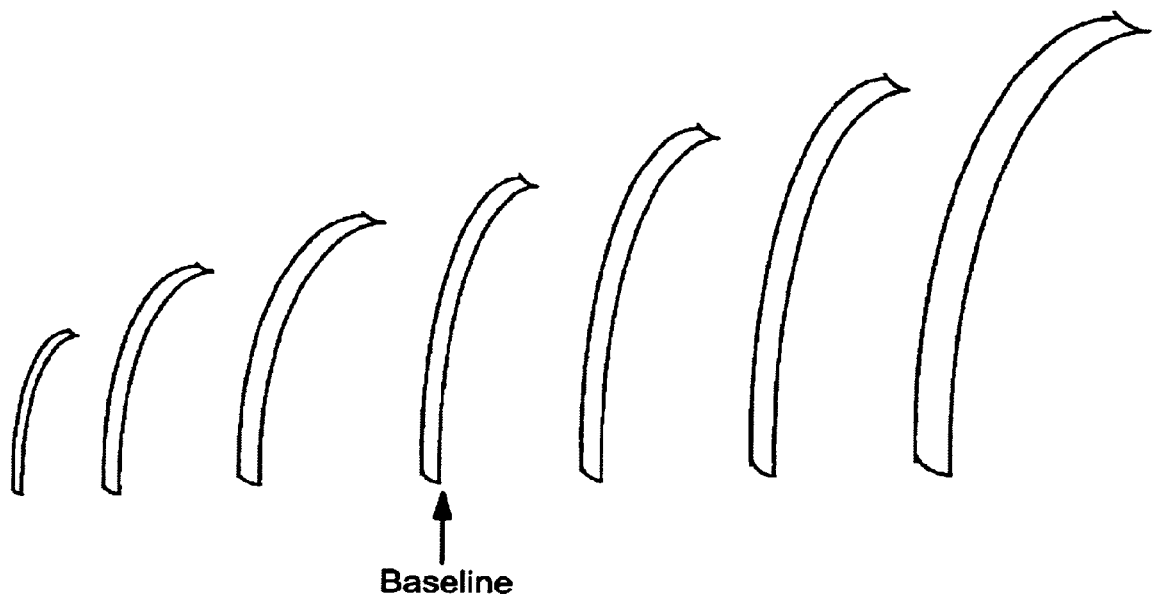
FIG. 4 illustrates another variation of a display element of the icon in FIG. 1.

FIG. 3 illustrates an example of changes in size of the flower head to indicate absolute price of a stock. FIG. 3 shows four illustrative increments of size, although people can normally perceptually register and memorize up to seven different sizes, and the additional sizes are not illustrated. FIG. 4 shows seven different lengths of a stem element of the daisy icon, each indicating the present standard deviation of volume traded in the stock. The indicated baseline length indicates the mean, with the smaller stems showing 0.5, 1 and 2 SDs down relative to the average for that stock at that time of day, and the larger stems indicating 0.5. 1, and 2 SDs above the average.

A further display element which cannot be easily diagrammed in a static figure is the motion of each individual daisy stem and head. In the illustrative embodiment, the frequency of the side-to-side swaying motion indicates the standard deviation in price, either based relative to opening price or a longer-term rolling average. For example, a slow swaying is a low SD, whereas a wild flapping is a higher SD.

Figure 5:
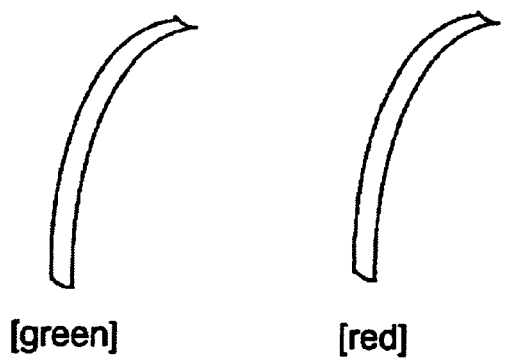
FIG. 5 illustrates the application of a color variation of an icon element of FIG. 1.

FIG. 5 illustrates the use of color in one of the daisy elements, in this case the stem, to indicate the direction of change. Green is used to show that the price change from opening is upward, and red is used if the change is downward. The combination of stem color and length thus gives a direct reading of the SD and direction of the change in stock price, and the petals indicate the number of points of change and the absolute price of the stock. Couple this data display with the frequency of the waving motion of each daisy, and you have a compelling visual display that clearly shows which stocks have experienced large percentage changes on the day. A user-selectable feature can permit change of the colors for people who may be colorblind, such as yellow and blue instead of green and red.

Figure 6:
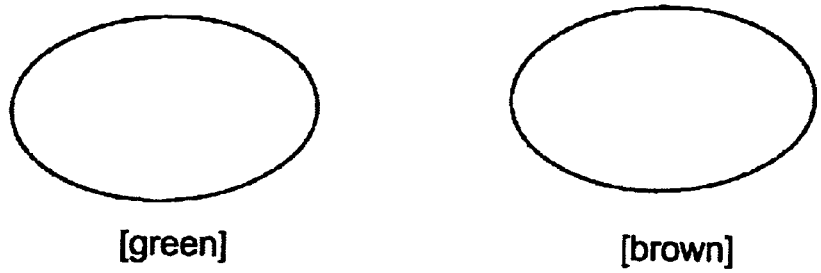
FIG. 6 illustrates another application of color variation of another portion of a display icon as shown in the embodiment in FIG. 1.

FIG. 6 shows another use of a color element whereby the small patch of "grass" surrounding the daisy stem is colored green or brown. The selected color indicates a very short term measure of consistency. A preconfigured number N of trades (e.g., selectable from 2 to 8) is monitored. If N of the previous trades in a row have been for increasingly higher prices, the grass is a lush green, but if progressively lower prices, the grass is a dying brown.

Figure 7:
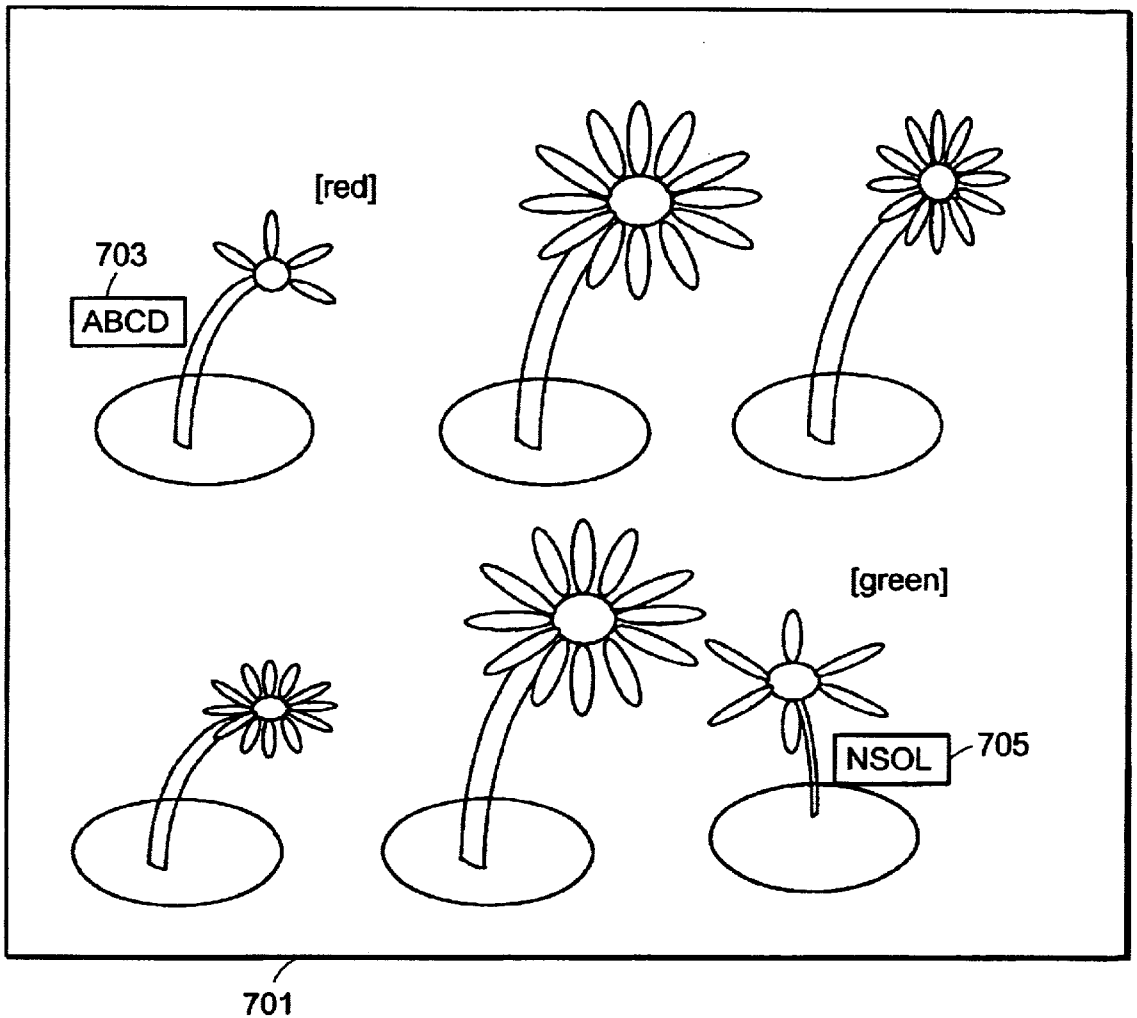
FIG. 7 illustrates a portion of a system display in which a plurality of display icons is arranged in an illustrative embodiment.

In FIG. 7, a background 701 of green provides a visual baseline for a mild perspective element. A strong three-dimension effect is not desirable as it would distort the measures illustrated by daisies "further away" from the viewer. The green background also provides a visual contrast to the display elements of each daisy icon. The shadow of the daisy head can also be projected upon the grassy background, to provide further visual clues as to the size and motion of the daisy head.

FIG. 7 also illustrates how a set of daisies is generally arranged with each daisy representing data corresponding to a different stock, and six stocks shown in the example. Experiments have shown that approximately -one hundred daisies can be displayed on a computer without losing any significant visual information or becoming overwhelming. The icons are also. sorted. according to user-selectable criteria, such as the size of the SD of price for the day (the swaying frequency), or any of the other displayed data criteria. The user can be supplied with graphical buttons on the display that indicate the criteria for sorting the icons top to bottom, as well as for selection of the type of baseline from which to measure changes (e.g., rolling average, opening price). Other user selection means, such as sliders or radio dials could also be used, or sets of criteria pre-defined and selected by different users or for different types of data displays.

The icons could even be arranged according to irrelevant information such as the name of the company, or the type of industry, but this would tend to undermine the pattern recognition feature of the system. However, it may be useful to divide a large display into segments comprising stocks of different levels of interest to the viewer, such as a "window" of favorite stocks separated from the rest of the display field, as further described below.

Visual processing in the brain is divided into two major systems devoted to spatial properties or object properties. The latter processing can be further divided into systems that deal with shape and surface properties of objects, making a total of three categories.

The set of spatial. properties is comprised of elements relating to location, change in location, speed, trajectory (straight/curved), orientation, relation of parts to the whole, and spatial relations among objects. The set of shape properties includes form of the shape, size, number of parts, form of the parts, and symmetry or asymmetry. The set of surface properties includes color (hue), saturation/intensity, texture, and temporal patterns (blinking, pulsating).

Similarly, the auditory processing of the brain is divided into two major systems: localization and identification. Localization refers to the spatial orientation of a sound (e.g., right, left). Identification parameters include different instruments (timbre differences), different notes, different octaves, degree of consonance or dissonance, loudness, chord progression, and temporal patterns (e.g. warbles, "bent" notes, rhythm, tempo, duration, decay, staccato).

In another embodiment, different sets of stocks could be displayed simultaneously in different quadrants of the display, making further use of visual and auditory dimensions to distinguish the sets. The flowers (or other suitable icons) in each quadrant will be visibly different, for example having different texture, different color in the center of the head, or different shape. The data values will be ordered along dimensions that meet in the center of the display, i.e., the corresponding corner of each quadrant.

In this alternative embodiment, a number of additional changes will be implemented. Each time a sound occurs, the appropriate flower "lights up" with a color pulsing for 30 seconds, once per second, with green to indicate a trade price is up and red indicating down. The intensity of the color will be directly proportional to the trade volume, mirroring the volume of the accompanying sounds. When a flower lights up, its symbol can optionally appear and remain visible during the time the flower is lit up, as illustrated by two examples 703, 705 in FIG. 7.

Furthermore, when news about a stock appears, an animated animal, such as a rabbit, will run over to the flower and nibble on the grass beneath it. The rare occurrence of news is highlighted by the highly visible intrusion by the new data pointer—the rabbit. Other unusual animated changes could be used to indicate stock-specific changes, such as making the entire flower temporarily turn black or some other color. At any time during the display, a user may also position the mouse cursor over a flower and obtain detailed readouts of numerical or graphical data for the selected flower. A group of flowers could be selected and the detailed readouts would contain information for each member of the group (e.g., a multi-plot graph of trading price for each stock selected).

The border around the display, and the background colors can also be manipulated to provide additional information. For example, changing the border color could indicate the overall price of the market, with green being positive, and red being negative with more saturated and deep colors indicating greater changes since opening, and the intensity representing the overall volume. Furthermore, the display after the end of the trading day would indicate changes relative to the day as a whole (e.g., speed representing standard deviation of opening price from the day).

FIG. 8 shows a table indicating the data elements of the icon and the corresponding type of data associated with the display element. As already mentioned, different sounds can be selected, as well as different colors. Furthermore, it should be appreciated that many different shapes of flowers or trees can be used equally well. For example, fruit trees with different branch lengths, number of leaves, number of apples, height, and overall size. Different types of fruit trees could appear in different display quadrants representing different sets of stocks. Similarly, grape vines can be displayed with variations of number, size and color of grapes, and symmetries of the grape bunches. Corn stalks can be displayed with data indicated by height, number of ears, size and color of ears, stalks and leaves, and movement of stalks. Deciduous trees could be used, with lush spring foliage changing to fall colors, and wintry exfoliation, along with variations of girth, height, size of trunks, numbers of branches/leaves, roots, and amount of root spread. Palm trees can have varying leaf size and color, height, and number and color of nuts, much like overgrown daisies.

Other examples of ecologically valid visual displays include pets, zoo animals, fish, birds, insects or people. Pet or other zoological icons may vary according to body length, tails, hair color and amounts, ears, wagging tails, or hopping up and down at varying speeds or heights. Different pets could be used in different display quadrants, and corresponding pet sounds incorporated into the interface to quickly draw the user's attention to the proper quadrant for changes.

Variations in fish are potentially numerous, including colors, sizes, patterns on body, fin location and length, textures, movements of fins or tails. Similarly, birds have varying plumage colors, wing span, wing placement (open, closed, flapping speed), position (head up, down), and activities, such as flying, sleeping, pulling a worm from the ground. Insects, including butterflies, can be similarly varied in similar elements as birds.

People-based icons can have not only naturally occurring variations, such as height, proportions, and movements (arms, legs, heads, bodies), but also artificial changes that can be readily recognized. These include clothing style, color, and condition. Sounds can include voices (shouting, talking, singing, groaning). A down-market would be portrayed as a charicature of itself with short, slumped people with arms flailing and groaning noises.

Other familiar environmental objects such as buildings, sailboats or other vehicles are easily recognizable and have many visually variable characteristics. Buildings have height, width, texture, color, lights on in windows, and perhaps swaying motion (as in earthquakes). Sailboats have size, number and shape and texture of sails and hulls, wind from the one side is good, and the other is bad. Sea turbulence can display global factors and other unique tags can be easily placed on the icons to represent problems such as a pirate flag, or taking on too much water (i.e., sinking).

Although the system has been described with respect to the representation of data related to trading stocks, it should be appreciated that the system according to the illustrative embodiment is also applicable to any large multidimensional data set. These applications may be broadly divided into two types: rapidly changing (i.e., more than once per minute), or slowly changing, where exploration and discover of patterns will be more important than noticing rapid changes.

Examples of rapidly changing data sets include the following: stocks and other financial instruments, as already described, EEG data in various frequency bands recorded from different portions of the brain and varying in time, information traffic in different parts of a large-scale communication network or other complex process, and health data for individual patients in a hospital indicating how such parameters change over time (including temperature, blood pressure, EKG, EMG, heart rate, or diabetic parameters, including blood sugar, calories consumed, insulin taken and level of exercise).

Examples of slowing changing data include those regarding census (demography), oceanography (temperature, chemical and life type and density), epidemiology, crime statistics, geology, and climate. Other examples are economic data such as unemployment rates, sectors of GNP, global or regional economic statistics, corporate financial analyses (quarterly reports over time, balance sheets, productivity, etc.), market survey or polling results, education test scores (representing different classes, schools, districts showing changes over time), and historical data such as population changes, income, family size and occupations. The system could be applied to information about auction prices, display price, changes in bidding price, frequency of bidding, age and other information about objects being sold.

Still other examples include data from the social and behavioral sciences (psychology and sociology) in which complex data sets for evaluating conditions like depression include variables such as exercise, family history, level of social interaction, and extent of social support network. Each person would be indicated by a separate flower (or other icon object) so that patterns could be viewed. Similarly, large data sets for cities or towns provide information on body image and self-concept variation over the day, and other data sets include factors relating to developmental performance on tasks, IQ, medical history, and other factors which may be relevant to determining useful correlations. Application to a corporate hybrid data set could display personnel data relating to individual productivity, evaluation ratings, test scores, compensation, and other variables.

Although the system has been described according to an illustrative embodiment as implemented on a personal computer, one skilled in the art will appreciate that other implementations can be equally advantageous. For example, a user can have a personal digital assistant or other handheld device that provides the necessary visual and audible displays. Similarly, the audible portion can be broadcast to a portable headset worn by the user, thus allowing the user to move away from the visual display, or even to operate the audible display separately. Also, a display could be transmitted to one or multiple remote users simultaneously by way of a communication network properly adapted for the purpose, with general purpose or specially designed means for visual and auditory display for each user.

Figure 9:
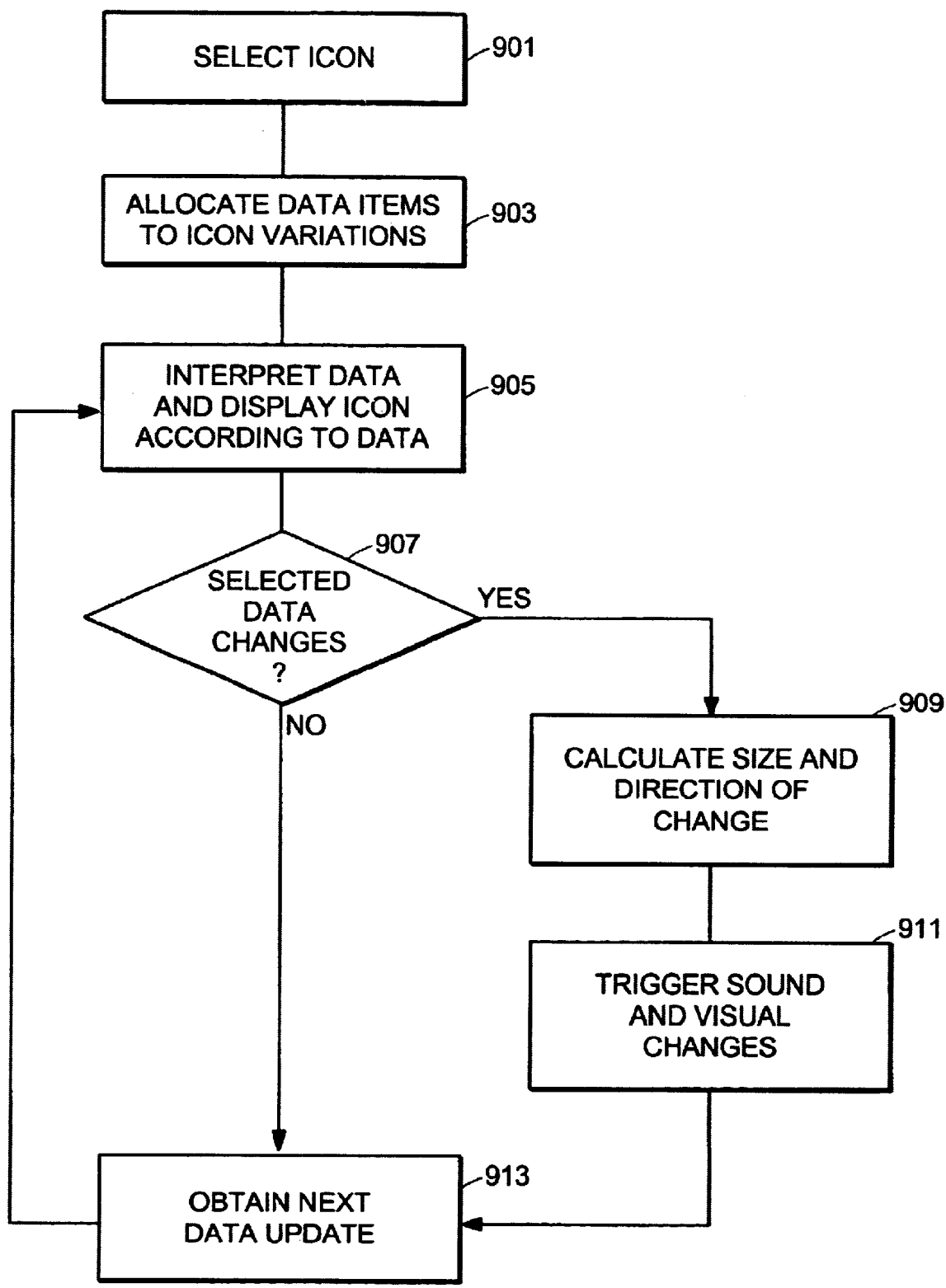
FIG. 9 diagrams a logical process for creating an ecologically oriented display according to an illustrative embodiment of the system.

FIG. 9 illustrates a logical process for a system implementation of an illustrative embodiment. In step 901 the user selects an icon, or set of icons if using quadrant displays. Step 903 relates the data items to icon elements, along with ranges and corresponding colors, and how changes are to be indicated. Step 905 interprets the data set and displays each icon according to its corresponding data, as determined by the relationships determined in the previous step. Where changes are detected 907 from the previous data set, a size and direction of change is calculated 909 and corresponding sound and visual indications are triggered 911. If no changes were detected, or the change indications have been triggered, then a new data update 913 is obtained and the system loops back to the interpretation step 905 until the system is terminated or data: exhausted. Other steps not specifically illustrated, but described herein include, polling for user inputs to change the data interpretation thresholds or baselines, and steps for providing data termination summaries (e.g., end of the day).

Although the system is shown and described with respect to several illustrative embodiments thereof, it should be appreciated that the foregoing and various other changes, omissions, and additions in the form and detail thereof could be implemented without changing the underlying invention.

What is claimed is:

1. A method for visualization of multi-variate patterns and changes in large data sets comprising the steps of:
   selecting an ecologically valid icon;
   allocating data items to a set of variations of icon elements;
   interpreting a data set for configuration of at least one icon element according to a variation selected from said set; and
   displaying said icon.

2. The method of claim 1 in which said step of allocating data items further includes the steps of:
   selecting a set of ecologically valid sounds, each of which have variations that are naturally interpreted as indicating a continuum from poor to good; and
   assigning values on the sound continuum of each said sound to specific changes in data.

3. The method of claim 2 in which said sound variations are selected from the set of loudness, timber, tone, location, brightness, tempo, rhythm, decay, duration, combinations, and relationships among multiple sounds.

4. The method of claim 1 in which said step of interpreting a data set further includes the steps of:
   displaying a field of icons, at last one icon per data set;
   determining an organization of said field, according to at least one data variable selected by the user.

5. The method of claim 1 in which said step of allocating data items further includes the steps of:
   selecting a set of ecologically valid visual elements of said icon, each of which have variations that are naturally interpreted as indicating a continuum from poor to good; and
   assigning values on the visual continuum of each said visual element to specific changes in data.

6. The method of claim 5 in which said visual variations are selected from the set of color, size, shape, location, orientation, motion, blinking, continuity, and color intensity.

7. The method of claim 5 in which at least one of said icons is a flower and said set of visual elements includes at least one element selected from: a number of petals, a color of petals, a size of petals, a length of stem, a color of stem, a swaying motion of said stem, and a color of background around said stem.

8. The method of claim 1 in which said step of interpreting further includes the step of:

triggering a change to a corresponding icon element selected from said set of variations according to whether a data change exceeds a predetermined threshold.

9. The method of claim 1 further including the steps of:

selecting a second type of ecologically valid icon;

allocating data items to a second set of variations of said second icon elements;

interpreting a data set for configuration of at least one of said second icon elements according to said allocation; and displaying said second type of icon.

10. The method of claim 9 in which each type of ecologically valid icon is displayed in a portion of a display area separate from a portion populated by any other type of ecologically valid icon.

11. The method of claim 1 further including the steps of:

arranging a display having a plurality of said icons; and visually highlighting an icon representing a data change larger than a predetermined threshold, and maintaining said highlighting for a predetermined period.

12. The method of claim 1 in which said step of interpreting a data set further includes the step of triggering a sound indicator when a predetermined data element in said data set undergoes a change within a predetermined time.

13. The method of claim 12 in which said sound indicator is selected from a set of ecologically valid sounds, each of which has selectable variations that are naturally interpreted as indicating a continuum from poor to good; and said sound indicator and its corresponding variant is selected according to specific thresholds of change in said predetermined data element.

* * * * *